Jan. 14, 1941.  H. WOLLNER  2,228,715
UNIVERSAL JOINT
Filed Jan. 16, 1939  2 Sheets-Sheet 1
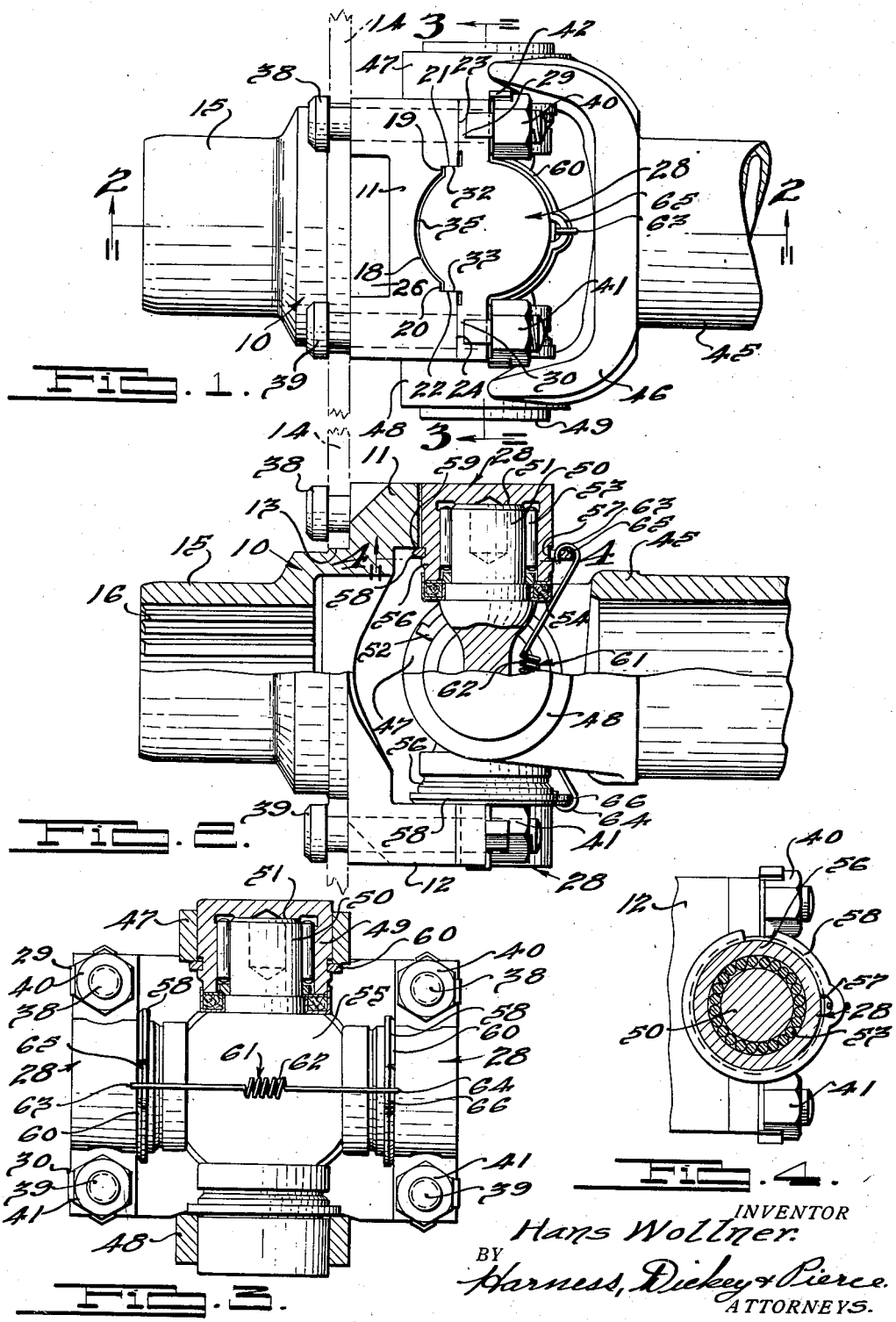
INVENTOR
*Hans Wollner.*
BY *Harness, Dickey & Pierce.*
ATTORNEYS.

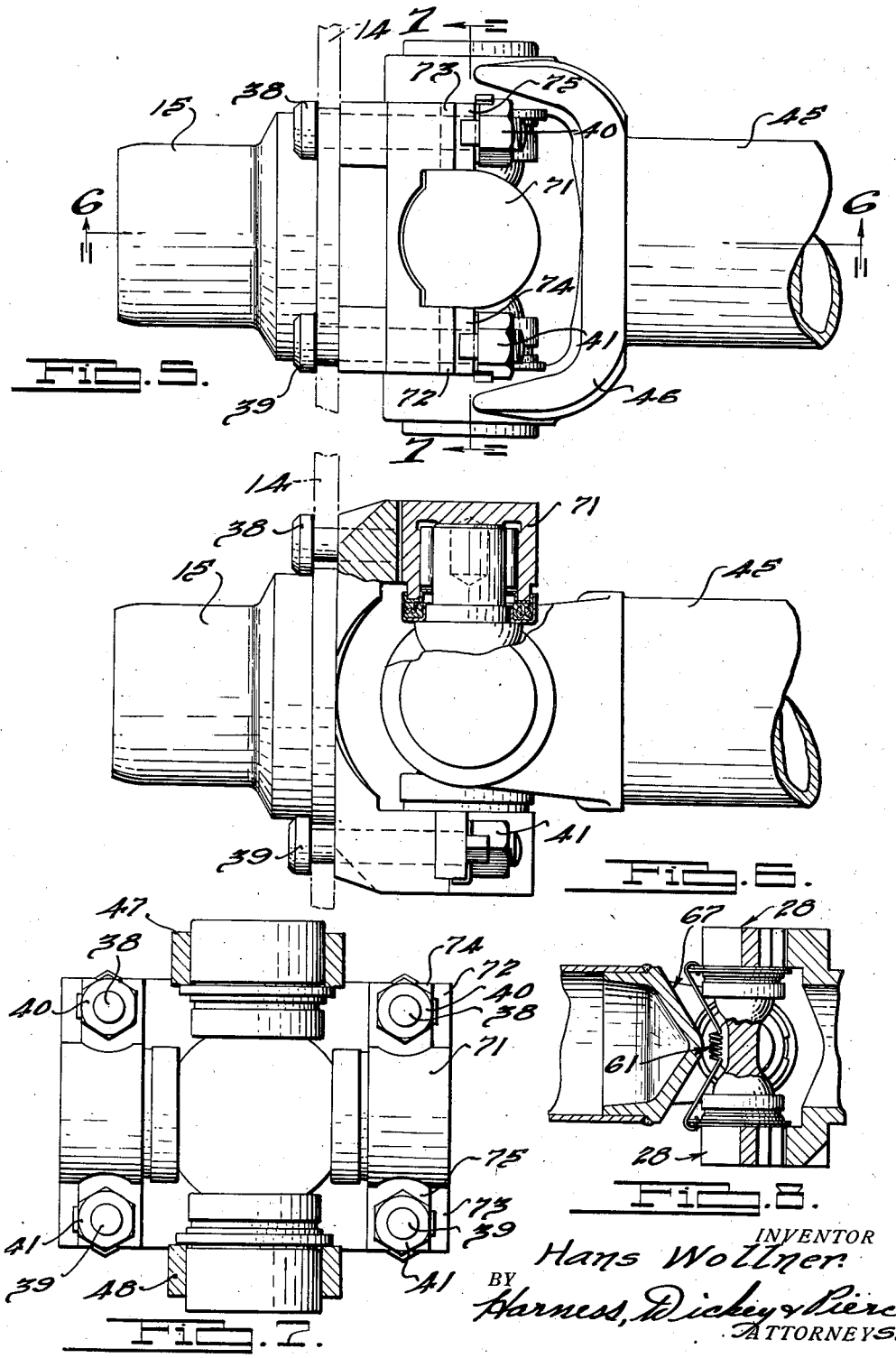

Patented Jan. 14, 1941

2,228,715

UNITED STATES PATENT OFFICE 2,228,715

UNIVERSAL JOINT

Hans Wollner, Detroit, Mich., assignor to Universal Products Company, Incorporated, Dearborn, Mich., a corporation of Delaware Application January 16, 1939, Serial No. 251,075

1 Claim. (Cl. 64—17)

The invention relates generally to joints for shafts and it has particular relation to a joint of universal character.

In certain respects the invention is similar to and constitutes an improvement over that embodied in my copending application for patent relating to Universal joints, Serial No. 226,029, filed August 22, 1938. In such copending application for patent, a joint is provided which includes bearing blocks that are fastened in position by a yoke by means of axially extending bolts. This construction permits the joint and shaft members to be assembled by axially bringing the parts into proper relation.

One object of the present invention is to provide a joint of this type having improved means for centering the bearing blocks and for taking torsional thrust forces occurring during operation of the joint.

Another object of the invention is to provide an improved bearing block arrangement which reduces the axial overhang of the trunnion received by the block, with respect to the yoke to which the block is secured.

Another object of the invention is to provide an improved design of universal joint having an improved bearing block and yoke arrangement, for the purpose of obtaining in a joint of the general character to which the invention relates, a large capacity to take torsional thrust forces and a minimum size and weight while still providing for an efficient and satisfactory bearing surface area.

Other objects of the invention will become apparent from the following specification, from the drawings to which it relates, and from the claim hereinafter set forth.

For a better understanding of the invention, reference may be had to the drawings, wherein:

Figure 1 is an elevational view of a universal joint constructed according to one form of the invention;

Fig. 2 is a sectional view taken substantially along the line 2—2 of Fig. 1, with approximately one half of the construction still shown in elevation;

Fig. 3 is a cross-sectional view taken substantially along the line 3—3 of Fig. 1, with certain parts remaining in elevation;

Fig. 4 is a cross-sectional view taken substantially along the line 4—4 of Fig. 2;

Fig. 5 is a view on the order of Fig. 1, illustrating another form of the invention;

Fig. 6 is a sectional view taken substantially along the line 6—6 of Fig. 5, with certain parts remaining in elevation; and Fig. 7 is a sectional view taken along the line 7—7 of Fig. 5, with certain parts remaining in elevation, and Fig. 8 is a fragmentary view illustrating the joint at the non-splined end of a tube shaft and particularly illustrating an advantage of the configuration of spring employed.

Referring to Figs. 1 and 2, the joint illustrated includes a yoke 10, having diametrically opposed ears 11 and 12 and a cylindrical shoulder 13 adapted to receive a brake drum 14. A cylindrical portion 15 of the yoke is provided with internal teeth 16 by means of which it may be secured to a drive shaft, not shown, projecting from the transmission of the motor vehicle.

As shown by Fig. 1, each of the ears 11 and 12 is recessed at its axial side opposite the brake drum 14, and this recess is defined by a circumferentially extending curved surface 18, short circumferentially extending flat surfaces 19 and 20 at the ends of the curved surface 18, and short axially extending shoulder surfaces 21 and 22 at the ends of the surfaces 19 and 20. At opposite ends of the recess so defined, the ears are provided with circumferentially extending and aligned surfaces 23 and 24 and these surfaces lie in a plane normal to the axis of the joint. It may be noted also, that each ear adjacent the brake drum, has a recess 26 and this is provided to reduce the weight of the yoke without rendering the yoke insufficiently strong to carry the brake drum.

Each of the ears 11 and 12 is adapted to support a bearing block 28 having wings 29 and 30 adapted to fit against the surfaces 23 and 24, and also having shoulder surfaces 32 and 33 adapted to closely fit the surfaces 21 and 22. Between the shoulder surfaces 32 and 33, the block approximately corresponds in shape to the shape of the recess in the ear, excepting a slight space 35 is allowed so as to insure that the wings 29 and 30 will fit against the surfaces 23 and 24.

For securing the bearing block to the ear, headed bolts 38 and 39 are employed and these extend through openings in the brake drum 14 and through the ear at opposite sides of the recess and then through openings in the wings 29 and 30. Nuts 40 and 41 on the ends of the bolts hold such wings against the surfaces 23 and 24 and to prevent accidental loosening of the nuts, lock washers 42 are employed as will be readily understood. It has been stated that the shoulders 32 and 33 on the bearing block fit closely between the shoulder surfaces 21 and 22 on the ear, and this relation is desired so that during operation of the joint, torsion loads will be conveyed through the shoulder engagements, instead of through the bolts connecting the block to the ear. In this connection, it may be mentioned that the bolt receiving openings in the wings 29 and 30 are sufficiently large that such torsion forces will be carried by the closely related shoulders.

The driven shaft member is indicated at 45 and this likewise includes a yoke 46, but in this case the yoke has closed eyes 47 and 48 which receive bearing cups 49. The bearing blocks on the yoke 10 and the two bearing cups thus provided on the yoke 46, respectively, receive trunnions 50 on a cross 55 and these trunnions have end thrust engagement with the base portion of the bearing blocks and the base portion of the bearing cups, as indicated at 51 in Fig. 2 and in Fig. 3. Small roller bearings 53 are provided around each of the trunnions and a sealing means, including a packing ring, 54 is provided at the base of each trunnion for retaining lubricant within the bearing and preventing entrance of dirt. Details of this arrangement need not be further described inasmuch as they are embodied in the copending application for patent, to which reference has been made.

Now, for retaining the bearing blocks in radial position with their base portions against the ends of the trunnions so as to center the joint and take radial end thrust, each bearing block radially inward of the wings 29 and 30 has a cylindrical extension 56, shown by Figs. 2, 3, and 4, and this extension has an annular, external groove 57 adapted to receive a snap ring 58. This snap ring projects under and engages a surface 59 at the radially inner side of the ear so as to locate the bearing block in position and one edge of the ring is beveled, as indicated at 60, to facilitate movement of the ring to its operative position. A similar ring 52 is provided for locating each of the bearing cups 49 in the eyes 47 and 48.

For holding the bearing blocks substantially in their innermost positions on the trunnions during transit and prior to securing such blocks to the yoke, a spring element 61 is provided which has an intermediate coil portion 62 and hook shape ends 63 and 64. The hook shape ends engage eye portions 65 and 66 formed on the snap rings and as so employed, the spring resiliently holds the bearing blocks against the packing at the base of the trunnions and substantially against the ends of the trunnions. Thus, when the assembly of yoke 46, cross 55, and bearing blocks 28 is brought into position for axial assembly with the yoke 10, the blocks 28 and snap rings 58 thereon are so located that the bevels 60 on the rings will be in a position to cam the rings and blocks into their proper positions. Normally, the final movement of the snap rings and blocks axially of the joint draws the blocks towards each other axially of their trunnions, and thereby draws such blocks into close relation with the ends of the trunnions so that the blocks serve to accurately center the trunnions.

Initially the springs are so constructed that the ends project parallel to each other and in the same direction from the ends of the coil and at right angles to the axis of the coil, and then when the hook portions are pulled apart for engagement with the eyes of the snap rings, the entire spring element assumes a bowed configuration, as shown, which throws the coil almost against the central side surface of the cross. This is desirable particularly in the assembly shown by Fig. 8 where the yoke at the end of the tube has a conical reinforcing protuberance 67 that projects towards the center of the cross. The bowed spring, while still serving as a resilient connector, avoids contact both with the cross and the protuberance on the yoke.

Attention is directed to the fact that the relation between the engagement of the bearing blocks and the ends of the trunnions disposed therein, and the engagement between the snap rings and the inner sides of the ears, is such that when the snap rings are applied, substantially a close fit is obtained between the bearing blocks and the ends of the trunnions. It may also be observed that the various surfaces on the ears and on the bearing blocks may be broached so as to obtain the fitting relations described previously. As for the bearing blocks, normally these will be made by rolling elongated bars to the sectional shape of the block and then severing the bar into lengths corresponding to the length of the block and finally removing parts to provide the cylindrical portion 56 and the annular groove for receiving the snap ring.

Now, referring to Figs. 5, 6, and 7, the joint disclosed is very similar to that already described with the exception that the bearing blocks, indicated at 71, instead of being located by snap rings are located by means of projecting tongues 72 and 73 on the ear, which overlap wings indicated on the block at 74 and 75. As shown best by Fig. 7, the wings 74 and 75 are so related to the block that the tongues 72 and 73 have their outer surfaces substantially flush with the outer surface of the body of the block so that the outer end of the assembly is substantially smooth. It will be understood that the inner surfaces of the tongues 72 and 73 and the outer surfaces of the wings 74 and 75 are finished accurately to dimensions and with a definite relation to the end faces of the trunnions and the inner end wall surfaces of the blocks so that the overlapping parts will properly center the cross and thus properly center the joint. The various surfaces will be formed by broaching as previously specified. In this construction, the yoke member 46 is connected to the cross in the same manner as previously described.

A joint of either character may first be assembled with the yoke 46 but without the yoke 10, and then moved axially relative to the latter yoke until the bearing blocks are located properly on such latter yoke; after which the bolts may be applied to secure the parts together. Thus, a knock down arrangement is provided which readily permits assembly of the shaft sections during assembly operations in automobile manufacturing plants. It is to be observed also that the outer surfaces of the joint at the bearing blocks are smooth or free from projections, thereby reducing diametrically protruding projections and enhancing the appearance of the joint.

With respect to the design and shape of the yoke and bearing blocks secured thereto, and considering the factors of providing ample bearing surface area and securing the brake drum to the yoke by the block securing bolts, the joint obtains a large capacity to transmit torsional thrust forces with a minimum in weight and size. Necessarily, the size of the bearing surface area, the fastening of the brake drum to the yoke by the block fastening bolts, and the capacity to take torsional thrust forces are factors to be consiered when questions of weight and dimensions are involved, and realizing these factors, it is to be appreciated that the shape of the block and yoke permit minimization of the weight and size. More particularly, employment of a block that is substantially cylindrical except for the attachment wings, reduces the weight of the block, and since the torsional thrust shoulders are small but amply large for conveying torsional thrust forces, the weight is increased but little by the shoulders. Then too, the shape of the recess in the yoke is such as to obtain great strength without any weakness at such shoulders. Also, the location of the wings on the block and the shape of the recess in the yoke throws the center of the trunnion recess in the block axially close to such shoulders and thus overhang axially of the joint is very small. Again, the locations of the wings and of the nuts on the bolts are such as to eliminate any interference between such nuts and the second yoke during oscillation of the latter.

In general, therefore, the design of block and yoke allows the axial overhang of the block center relative to the torsional thrust shoulders to be substantially reduced and permits reduction of weight and size of the parts, while still allowing for a desired bearing area, strength of parts, and particularly for capacity to take torsional forces, and for an arrangement that does not create interference during oscillatory movements in the operation of the joint.

Although more than one form of the invention has been described and illustrated in detail, it will be apparent to those skilled in the art that various modifications may be made without departing from the scope of the appended claim.

What is claimed is:

In a universal joint, a rotary yoke having a radially extending recess and bearing surfaces at the sides of the recess, a generally cup shape bearing block having a cylindrical trunnion receiving opening and wings projecting from opposite sides thereof and bearing against the bearing surfaces, said block also having circumferentially spaced abutments for abutting circumferentially spaced surface portions of the recess, the block being cylindrical in contour at its radially inner end inwardly of said abutments and the cylindrical part being provided with an annular groove, a shoulder on the yoke at the radially inner end of the recess, and a separable ring on the block located in said groove and projecting under the shoulder for locating the block radially of the joint.

HANS WOLLNER.